No. 646,658. Patented Apr. 3, 1900.
D. C. FRAZEUR.
GEARING.
(Application filed Mar. 18, 1899.)

(No Model.)

Witnesses
Geo. E. Much
Chas. R. Wright Jr.

Inventor
D. C. Frazeur,
by A. S. Pattison,
Attorney.

THE NORRIS PETERS CO., PHOTO-LITHO., WASHINGTON, D. C.

UNITED STATES PATENT OFFICE.

DAVID C. FRAZEUR, OF NEW MARKET, NEW JERSEY.

GEARING.

SPECIFICATION forming part of Letters Patent No. 646,658, dated April 3, 1900.

Application filed March 18, 1899. Serial No. 709,683. (No model.)

*To all whom it may concern:*

Be it known that I, DAVID C. FRAZEUR, a citizen of the United States, residing at New Market, in the county of Middlesex and State of New Jersey, have invented new and useful Improvements in Gearing, of which the following is a specification.

My invention relates to improvements in gearing, all of which will be fully described hereinafter and particularly pointed out in the claims.

This invention is especially devised to be used in connection with a bicycle crank-shaft and sprocket-wheel, though it is equally adapted for use in connection with other machinery.

Figure 1:
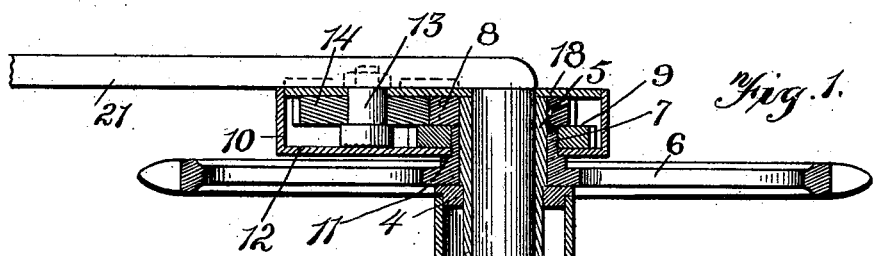
Figure 2:
Figure 3:
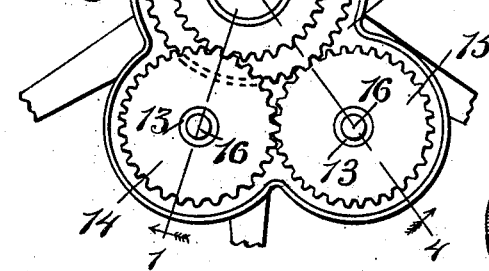
Figure 3:
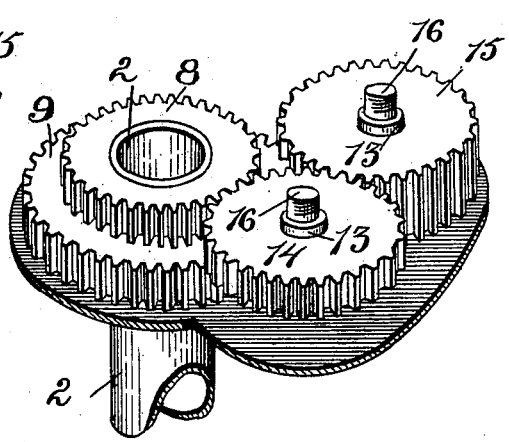
Figure 5:
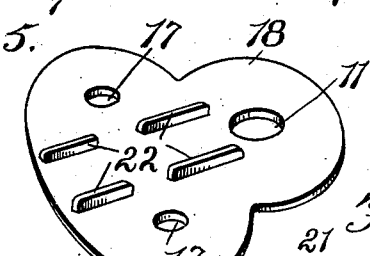
Figure 4:
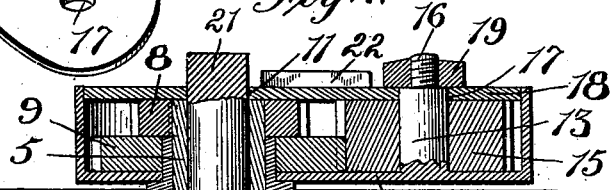

In the accompanying drawings, Figure 1 is a view showing it applied to a bicycle sprocket-wheel and which is a horizontal longitudinal sectional view taken on line 1 1 of Fig. 2. Fig. 2 is a side elevation of the gearing. Fig. 3 is a detached perspective view thereof. Fig. 4 is a sectional view taken on line 4 4 of Fig. 2. Fig. 5 is a detached perspective view of the outer wall of the casing in which the gearing is located.

Referring now to the drawings, 1 indicates a crank-hanger of a bicycle, through which passes a tube 2. One end of this tube 2 receives a screw-threaded bushing 3, which also screws into the adjacent end of the crank-hanger 1, and the inner end of the crank-hanger is supported by a bushing 4, through which the tube 2 passes and has its end 5 projecting therethrough. Journaled upon the projecting end of this tube 2 is a sprocket or other wheel 6, the said sprocket provided with a projecting flange 7, extending from the hub thereof. The projecting end 5 of the tube 2 projects beyond and outside of this flange 7, and secured to the projecting end of the tube is a pinion or gear 8, and which gear or pinion is made fast to said tube in any desired manner. A gear or pinion 9 is made fast to the flange 7 of the hub of the wheel 6. A casing 10 is provided with an opening 11, which receives the flange 7 of the hub of the wheel 6, and upon which flange the casing is journaled. This casing has its inner wall 12 provided with the journals 13, one of which receives a pinion or gear 14 and the other a pinion or gear 15. These journals 13 have screw-threaded projecting ends 16, which pass through openings 17 in the outer wall 18 and receive the nuts 19 for clamping the outer wall in position thereon.

The crank-shaft 20 passes loosely through the tube 2 and preferably has the crank 21 adjacent the gearing integral therewith, and this crank passes between the lugs 22 upon the outer wall 18 of the casing and which lugs serve to rotate the casing with the crank-shaft. The crank 24 at the opposite end of the crank-shaft 20 is detachably connected with the shaft by a key or otherwise, so that the crank 24 can be detached, the crank-shaft removed, and then access readily permitted to the gearing by the removal of the outer plate 18 of the casing 10.

By reference to Fig. 2 it will be noted that the gear-wheel 9, which is carried by the sprocket-wheel, is larger than the other gear and that the gear 14 overlaps this large gear 9 and is in engagement with the smaller gear or pinion 8, which is fast to the end of the tube 2. It will also be noted that the gear 15 is a wide or double faced gear and is so relatively journaled that it is in engagement with the large wheel 9 and the pinion 14.

The crank-hanger 1 being fast to the frame of the machine and the tube 2 fast to the hanger, the pinion 8, carried by the end of this tube, is likewise fast and does not rotate. This gear or pinion 8 therefore is the fulcrum of power or the point of resistance.

When the crank-shaft is rotated by means of the cranks 21 and 24 in the usual manner, the casing 10 is revolved, carrying with it the pinions 14 and 15, journaled to the inner wall thereof. This rotation of the case carries the wheel 14 around the pinion 8 of the tube 2, causing it to revolve and also to travel around the pinion, which gives to the wheel 14, and consequently the pinion or gear 15, two revolutions to each revolution of the crank-shaft, one revolution being that which would be given to the gear 14 if it were not in engagement with the pinion 8 and the other rotation being caused by its engagement with the pinion 8—that is to say, if the crank-shaft 21 were rigid with the pinion 14 it would make one revolution therewith; but not being rigid with the crank-shaft it is permitted to rotate, owing to its engagement with the non-movable pinion 8, which adds thereto another revolution, and consequently this revolution is added to the gear or pinion 15. This latter pinion 15 is in engagement with the large gear 9, which is fast to the sprocket 6. This gear 9 being larger in diameter than the gears 14 and 15, the two revolutions given to the gear 15 are not imparted to the wheel 9, owing to the increased diameter of this latter wheel. The relative diameter of the wheels 9 and 15 causes about one and three-quarters revolutions to the wheel 9, and consequently one and three-quarters revolutions to the sprocket-wheel to each revolution of the crank-shaft and its hanger. It will be readily understood, however, that the relative speed of the sprocket or other wheel 6 and the crank-shaft can be increased or decreased by increasing or decreasing the size of the gears.

By means of a gearing of the character here shown I am enabled to increase the relative speed of the sprocket-wheel as compared to that of the crank-shaft, as may be desired, thus enabling me to use a larger sprocket on the rear driving-wheel of a bicycle or other mechanism to be driven. The advantages of the relatively-larger gear-wheel upon the rear driving-wheel as compared to that of the sprocket-wheel 6 are obvious.

This mechanism is compact, inclosed from access of dirt and dust, simple and cheap to produce, and enables me to at will increase or decrease the relative rotation of the crank-shaft and the sprocket.

Having thus described my invention, what I claim, and desire to secure by Letters Patent, is—

1. A gearing comprising a rigidly-supported pinion 8, a drive-wheel loosely mounted upon said support and having an outwardly-projecting flange provided with a pinion 9, a gear-support loosely mounted on the flange and carrying a pinion 14 engaging the pinion 8, a second pinion 15 carried thereby and engaging pinions 14 and 9, and a crank attached to the gear-support, substantially as described.

2. A gearing for bicycles comprising a crank-hanger a tube supported thereby and having a projecting end carrying a pinion fast thereto, the tube being fast to the crank-hanger, a relatively-larger gear concentrically journaled in respect to said tube and its gear, a gear-support concentrically journaled in relation to the said tube, gears 14 and 15 journaled thereon and in engagement with each other, gear 14 in engagement with gear 8, and the gear 15 in engagement with the gear 9, a crank-shaft passing through the said tube and revoluble in relation thereto, and a connection between the crank and the gear-support whereby when the crank is rotated the gear-support and the gears carried thereby are likewise rotated, substantially as described.

3. A gearing comprising a rigidly-supported pinion 8, a loosely-mounted drive-wheel, a pinion 9 rigidly connected to the drive-wheel, a loosely but concentrically mounted gear-support independent of the drive-wheel and carrying two loosely-mounted pinions 14 and 15, the pinion 14 engaging the pinion 8 and the pinion 15 engaging pinions 14 and 9, and a driving member attached to the gear-support, substantially as described.

4. In a gearing for bicycles, the combination with a crank-hanger, a tube secured therein, and carrying at its outer end a pinion 8, a drive-wheel loosely mounted upon said tube and having a flange to which is secured a pinion 9, a casing loosely mounted upon the flange of the sprocket-wheel and inclosing the pinions 8 and 9, said case having a pinion 14 loosely mounted therein and meshing with a second gear 15 loosely mounted in said case and meshing with 14 and 9, a crank-shaft loosely supported in the tube and a crank connected to the shaft and secured intermediate its length to the casing, substantially as described.

In testimony whereof I have hereunto set my hand in the presence of two subscribing witnesses.

DAVID C. FRAZEUR.

Witnesses:
WM. J. DAVIS,
GEO. L. HARRIS.